UNITED STATES PATENT OFFICE.

HENRY SPENCER BLACKMORE, OF MOUNT VERNON, NEW YORK.

PROCESS OF REDUCING METALS AND PRODUCING ALLOYS THEREOF.

SPECIFICATION forming part of Letters Patent No. 675,190, dated May 28, 1901.

Application filed December 1, 1899. Renewed March 15, 1901. Serial No. 51,389. (No specimens.)

*To all whom it may concern:*

Be it known that I, HENRY SPENCER BLACKMORE, a citizen of the United States, residing at 206 South Ninth avenue, in the city of Mount Vernon, county of Westchester, and State of New York, have invented certain new and useful Improvements in Processes of Reducing Metals and Producing Alloys Thereof; and I do hereby declare the following to be a full, clear, and exact description of the invention, such as will enable others skilled in the art to which it appertains to make and use the same.

The object of my invention is to reduce metals from their oxids in a rapid, efficient, and economical manner; and it consists, essentially, in exposing the oxid to the action of metallic carbid while in a finely-suspended or liquefied condition, such as might be produced by dissolving the oxid in a molten flux, and allowing the excess oversaturation to remain suspended for the purpose of supplying the bath as the metal is reduced.

It is well known that many attempts have been made to reduce aluminium oxid by heating with carbon; but it is found that the great amount of heat required to be supplied to perform the reaction volatilizes the metal when thus reduced. It is therefore my object to previously combine carbon with a metal at a high temperature producing metallic carbids, which compounds absorb considerable heat during their combination and naturally liberate the same upon reaction, thus supplying the necessary heat within the reducing mass. It is also well known that with a material reduced to a finely-suspended molten or liquefied condition reaction takes place more readily than in solid form, as the molecules are free to circulate and react thoroughly instead of superficially, as in solid form. Taking into consideration the aforementioned facts I have found that aluminium oxid may be reduced in a heated state by the action of aluminium carbid alone; but the reduced metal being in such a fine state of subdivision is largely carried away with the gaseous products of decomposition in suspension, like flue-dust, and the reduced metal remaining being surrounded by oxid in the mixture prevents the metal from accumulating in a mass or button on account of its extreme lightness. The reaction which takes place may be illustrated by the following chemical formula or equation:

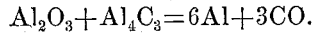
$$Al_2O_3 + Al_4C_3 = 6Al + 3CO.$$

I have found, however, that the reduction of the oxid may be accomplished at a lower temperature and in a more rapid and efficient manner and the reduced metal allowed to unite and accumulate in mass and the loss by suspension in gaseous products of decomposition prevented by reducing the oxid in a molten or liquefied condition, such as would be produced by adding oxid to molten cryolite or metallic fluorids and introducing aluminium carbid thereinto. It can be readily seen that the metallic oxid thus reduced is liquefied by the action of heated flux or molten chemical salts below the actual melting-point of metallic oxid, *per se*, and that the bath of chemical salts is inert—*i. e.*, not decomposed or injured by the metal reduced or by-products or have an injurious action on the contained oxid to be reduced.

The manner in which I prefer to carry out my process on a practical basis is to provide a mixture of cryolite (sodium-aluminium fluorid) with about one-fourth, by weight, of lithium fluorid in a molten condition, dissolve therein aluminium oxid, and then add thereto an equivalent of aluminium carbid until reaction ceases. Then add to the bath more oxid, followed by more carbid, as before, the molten bath merely acting as a suspending or solvent medium and is not deteriorated. The reduced metal accumulating below the mass is withdrawn from time to time, as desired. I find also that the addition of potassium fluorid to the molten bath facilitates the fusion of the materials, while the lithium fluorid present renders lightness, thus allowing the reduced aluminium to more readily settle and unite in mass.

Alloys of aluminium may be produced by employing carbids of other metals as reducing agent.

If calcium carbid is employed with cryolite as a flux, the calcium carbid first reacts with the aluminium fluorid, producing aluminium carbid and calcium fluorid. The aluminium carbid then reduces any oxid present to metallic state, the bath becoming depleted of aluminium fluorid and calcium fluorid substituted. When all the aluminium fluorid has been transformed, an alloy of aluminium and calcium is produced by action on further aluminium oxid by the calcium carbid. The calcium may be separated from the aluminium-calcium alloy by the addition of more aluminium fluorid or cryolite.

It is obvious that other metals may be reduced by addition of their oxids instead of aluminium oxid to a molten bath and reduction performed by other metallic carbids without departing from the spirit of my invention, which is simply the reduction of metallic oxids in a molten bath by action of metallic carbid. It is also obvious that either the metallic oxid or carbid may be produced in the bath by chemical reaction or added thereto, so long as the metal is finally reduced or reaction performed in the molten bath. The compound to be reduced can be suspended in a molten inert bath of chemical salts so long as the carbid will reduce it below the normal melting-point of the compound, the object being to perform the reaction in a molten inert bath of chemical salts, the presence of which induces the reduction at lower temperatures than would otherwise be possible.

The term "metallic carbid" used throughout this specification and claims has particular reference to a carbon compound of an ordinarily solid or liquid metal, but not to the gaseous or volatilizable hydrogen carbids, (hydrocarbons,) which have been used without commercial success, or carbids of the metalloids—such as silicon, boron, sulfur, &c.—which produce compounds of the metal with the metalloid instead of reducing metals, *per se*, and which I have already covered under United States Patents Nos. 605,378 and 605,380, of June 7, 1898, and Nos. 605,694 and 605,812, of June 14, 1898, and British Patent No. 23,707 of 1895.

It can therefore be seen from the foregoing description that my invention consists, essentially, in reducing metals and producing alloys thereof by concurrent combination of the electronegative constituents of metallic oxid and carbid and simultaneous reduction or liberation of like metals or unlike metals producing alloys, said action being induced at a temperature below normal reacting-point by the action of molten chemical salts of inert nature.

Having now described my invention, what I claim as new, and desire to secure by Letters Patent, is—

1. The process of reducing metals, which consists in exposing a molten bath of inert chemical salts free from hydrogen containing metallic oxid at a temperature below its normal melting-point, to the action of metallic carbid, the combined carbon of which is capable of reducing the oxid, thereby liberating the combined metal or metals.

2. The process of reducing metals, which consists in liquefying refractory metallic oxids at a temperature below their normal melting-point by the action of heated inert flux, then adding thereto a metallic carbid, the carbon of which is capable of reducing the oxid and liberating the combined metal, and replenishing the bath with oxid and carbid from time to time as the metal is reduced.

3. The process of reducing metals, which consists in introducing into a molten inert haloid bath containing metallic oxid at a temperature below its normal melting-point, metallic carbid capable of reducing the oxid.

4. The process of reducing metals, which consists in deoxidizing metallic oxid, by the action of metallic carbid capable of abstracting the oxygen therefrom in a molten inert bath of chemical salt at a temperature below the melting-point of the metallic oxid.

5. The process of reducing metals, which consists in liquefying metallic oxid at a temperature below its normal melting-point by the action of heated inert chemical salt, and introducing into the same a metallic carbid capable of abstracting the oxygen thereby reducing the metal therefrom by combination of their electronegative constituents.

6. The process of reducing metals, which consists in simultaneously reducing a metallic oxid and metallic carbid by concurrent combination of their electronegative constituents while in a molten bath of inert chemical salt at a temperature below the normal melting-point of contained oxid.

7. The process of reducing aluminium, which consists in exposing a molten bath of inert chemical salt containing aluminium compound at a temperature below its normal melting-point to the action of metallic carbid capable of liberating aluminium therefrom.

8. The process of reducing aluminium, which consists in exposing a molten inert bath containing aluminium oxid, at a temperature below the melting-point of aluminium oxid, to the action of aluminium carbid.

9. The process of reducing aluminium, which consists in dissolving aluminium oxid in a molten inert bath at a temperature below the melting-point of aluminium oxid, and introducing into the same aluminium carbid.

10. The process of reducing aluminium, which consists in introducing into a molten inert bath aluminium oxid and aluminium carbid, the temperature of said molten bath being below the melting-point of aluminium oxid.

11. The process of reducing aluminium, which consists in producing aluminium carbid in a molten bath of inert chemical salt, at a temperature below the melting-point of aluminium oxid, by chemical reaction, and adding thereto aluminium oxid.

In testimony whereof I affix my signature in presence of two witnesses.

HENRY SPENCER BLACKMORE.

Witnesses:
G. W. HOPKINS,
D. W. GARDNER.